United States Patent
Harutyunyan (10) Patent No.: US 12,506,156 B2
(45) Date of Patent: Dec. 23, 2025

(54) CURRENT COLLECTOR FOR LITHIUM BATTERY

(71) Applicant: Honda Motor Co., Ltd., Tokyo (JP)

(72) Inventor: Avetik Harutyunyan, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 855 days.

(21) Appl. No.: 17/837,544

(22) Filed: Jun. 10, 2022

(65) Prior Publication Data

US 2023/0402614 A1    Dec. 14, 2023

(51) Int. Cl.
*H01M 4/66* (2006.01)
*H01M 4/62* (2006.01)
*H01M 10/0525* (2010.01)

(52) U.S. Cl.
CPC ........... *H01M 4/663* (2013.01); *H01M 4/626* (2013.01); *H01M 10/0525* (2013.01)

(58) Field of Classification Search
None
See application file for complete search history.

(56) References Cited

U.S. PATENT DOCUMENTS

| | | |
|---|---|---|
| 2002/0006547 A1 | 1/2002 | Miyamoto |
| 2018/0123165 A1 | 5/2018 | Park |
| 2018/0151884 A1* | 5/2018 | Yushin ................. H01M 4/134 |

OTHER PUBLICATIONS

R. Zhang et al., "Conductive Nanostructured Scaffolds Render Low Local Current Density to Inhibit Lithium Dendrite Growth", Adv. Mater. 2016, 28, 2155-2162.
Yang et al., "Accommodating Lithium into 3D Current Collectors with a Submicron Skeleton Towards Long-Life Lithium Metal Anodes", Nat. Commun. 2015, 6, 8058; 9 pages.
Y. Zhang et al., "A Carbon-Based 3d Current Collector with Surface Protection for Li Metal Anode", Nano Res. 2017, 10, 1356-1365.
Zhu et al., "A Seamless Three-Dimensional Carbon Nanotube Graphene Hybrid Material", Nat. Commun. 2012, 3, 1225; 7 pages.
Zhou et al., "How Different are BN Nanotubes from Carbon Nanotubes?", Journal of Computational and Theoretical Nanoscience vol. 6, 1-8, 2008.

(Continued)

*Primary Examiner* — Wyatt P Mcconnell
(74) *Attorney, Agent, or Firm* — Patterson + Sheridan, LLP (57) ABSTRACT

Aspects of the present disclosure generally relate to battery technology, and more specifically relate to current collectors and uses thereof. In an aspect, a current collector is provided. The current collector includes a first component comprising a carbon nanotube; and a second component comprising a boron-nitride nanotube, wherein the first component is coupled to the second component. In another aspect, a battery of the present disclosure includes an electrode; and a current collector disposed over at least a portion of the electrode, the current collector comprising: a first fiber comprising a carbon nanotube, a boron-nitride nanotube, or a combination thereof; and a second fiber comprising a carbon nanotube, a boron-nitride nanotube, or a combination thereof, wherein an amount of boron-nitride nanotube in the current collector is about 20 wt % or more based on a total weight of the carbon nanotube and the boron-nitride nanotube in the current collector.

16 Claims, 3 Drawing Sheets

(56) References Cited

OTHER PUBLICATIONS

Liu et al., "Feasibility of Lithium Storage on Graphene and Its Derivatives", J. Phys. Chem. Lett. 2013, 4, 1737-1742.
Lima, Marcio D., et al.—"Biscrolling Nanotube Sheets and Functional Guests into Yarns," Science vol. 331, Issue 6013, pp. 51-55 (2011); Publication [online], Jan. 7, 2011 [retrieved on Sep. 26, 2023], DOI: 10.1126/science.1195912, entire document.
PCT International Search Report and Written Opinion dated Oct. 16, 2023, for International Application No. PCT/US2023/024433.

\* cited by examiner

CURRENT COLLECTOR FOR LITHIUM BATTERY

FIELD

Aspects of the present disclosure generally relate to battery technology, and more specifically relate to current collectors and uses thereof.

BACKGROUND

The search for high energy density electrodes is a central topic in lithium (Li) ion battery studies. During battery charging, the maximum gravimetric capacity could be achieved if Li is deposited on the anode directly as pure Li metal rather than stored in intercalation compounds such as graphite as in Li-ion batteries. However, Li metal problematically forms unstable structures, such as dendrites, during battery charge-discharge cycling. These dendrites are tiny, rigid tree-like structures having needle-like projections. These dendrites can pierce various structures in the battery, which may result in low Columbic efficiency and reduced battery lifespan. The current inability to overcome the dendrite challenge limits the widespread use of lithium batteries. To date, there is no well-established or commonly-accepted technology that overcomes this challenge.

There is a need for improved battery technology that eliminates, or at least suppresses, lithium dendrite formation during cycling.

SUMMARY

Aspects of the present disclosure generally relate to battery technology, and more specifically relate to current collectors and uses thereof.

In an aspect, a current collector is provided. The current collector includes a first component comprising a carbon nanotube; and a second component comprising a boron-nitride nanotube, wherein the first component is coupled to the second component.

In another aspect, a battery is provided. The battery includes an electrode; and a current collector disposed over at least a portion of the electrode, the current collector comprising: a first fiber comprising a carbon nanotube, a boron-nitride nanotube, or a combination thereof; and a second fiber comprising a carbon nanotube, a boron-nitride nanotube, or a combination thereof, wherein an amount of boron-nitride nanotube in the current collector is about 20 wt % or more based on a total weight of the carbon nanotube and the boron-nitride nanotube in the current collector.

In another aspect, an article is provided. The article includes a device; and a battery electrically coupled to the device. The battery of the article includes a first current collector; a cathode disposed over at least a portion of the first current collector; a separator disposed over at least a portion of the cathode; an anode disposed over at least a portion of the separator; and a second current collector disposed over at least a portion of the anode, wherein the first current collector, the second current collector, or each of the first and second current collectors, comprises: a first component comprising a carbon nanotube, a boron-nitride nanotube, or a combination thereof, wherein, when the first component includes a boron-nitride nanotube, an amount of boron-nitride nanotube in the first component is about 20 wt % or more based on a total weight of the first current collector; and a second component comprising a boron-nitride nanotube, a carbon nanotube, or a combination thereof, wherein, when the second component includes a boron-nitride nanotube, an amount of boron-nitride nanotube in the second component is about 20 wt % or more based on a total weight of the second current collector.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

DETAILED DESCRIPTION

Aspects of the present disclosure generally relate to battery technology, and more specifically relate to current collectors and uses thereof in, for example, lithium batteries. The inventor has discovered that certain materials utilized for current collectors can eliminate, or at least suppress, dendrite formation during charge-discharge cycling of a lithium battery. Accordingly, the current collectors, and uses thereof in lithium batteries, can be more stable and can present improved lifetime over conventional current collectors used in lithium batteries.

The search for high energy density electrodes is a central topic in lithium (Li) ion battery studies. During battery charging, the maximum gravimetric capacity could be achieved if Li is deposited on the anode directly as pure Li metal rather than stored in intercalation compounds such as graphite as in Li-ion batteries. However, Li metal can problematically form dendrites during battery charge-discharge cycling resulting in low Columbic efficiency and reduced battery lifespan. To date, there is no well-established or commonly-accepted technology that overcomes this challenge. For example, carbon nanomaterials used as substrates for metallic Li can fail to effectively suppress dendrite formation during cycling because the interaction between carbon nanomaterials and Li atoms is much weaker than the lithium-lithium interaction.

The origin of the problem as to why Li forms dendrites during cycling relates to the relationship between the binding energy of Li to an anode material matrix, M, ($BE_{Li-m}$) and the cohesive energy of bulk Li ($CE_{Li}$). On one hand, Li binding to the anode material matrix, such as carbon, should be weaker than on the cathode side to ensure the chemical potential driving force for subsequent Li migration from anode to cathode during discharge. On the other hand, this binding energy, $BE_{Li-M}$, should be greater than the cohesive energy of bulk Li, $CE_{Li}$, in order to prevent phase separation and formation of Li dendrites.

Briefly, and in some examples, a fiber, yarn, or thread that includes carbon nanotube (CNT) fibers and boron-nitride nanotube (BNNT) in desired proportions is utilized to provide a proper binding energy for Li atoms that overcomes challenges related to dendrite formation, among other challenges.

The fiber, yarn, or thread that includes CNT and BNNT, can also be utilized in a woven or non-woven article such as a textile, a fabric, or other structure (for example, web, film, mat, aggregate, or sheet). Here, for example, the textile, fabric, or other structure can be made of a plurality of the aforementioned fibers/yarns/threads by weaving to form the textile, fabric, or other structure. In some aspects, the ratio of CNT to BNNT within each fiber/yarn/thread can be varied and/or the weaving configurations of the individual fibers/yarns/threads can be varied to form desired textiles, fabrics, or other structures. Such textiles, fabrics, or other structures can be used as current collectors for electrodes, batteries, among other articles. The textiles, when incorporated into current collectors used for Li batteries, and as described herein, can exhibit improved suppression of dendrites, improved cycle life and Coulombic efficiency, reduced short circuits and failure, as compared to conventional materials used for current collectors.

In addition, and in some aspects, an electrically conductive material (for example, electrically conductive metal, electrically conductive metal alloy, or both) can be utilized with the yarns or fibers as well as the textiles, fabrics, or other structures. Here, and in some examples, the electrically conductive material can take the form of a wire/fiber that can be woven in the textile with the fibers/yarns/threads made of CNT, BNNT, or both CNT and BNNT. Additionally, or alternatively, the electrically conductive material can take the form of a particle or plurality of particles that is disposed on, deposited on, embedded in, or otherwise on or in surfaces, pores, or other facets/structures, of the yarns/fibers made of CNT, BNNT, or both CNT and BNNT. The electrically conductive material alloy can increase the electrical conductivity of the textile, fabric, or other structure.

Figure 1:
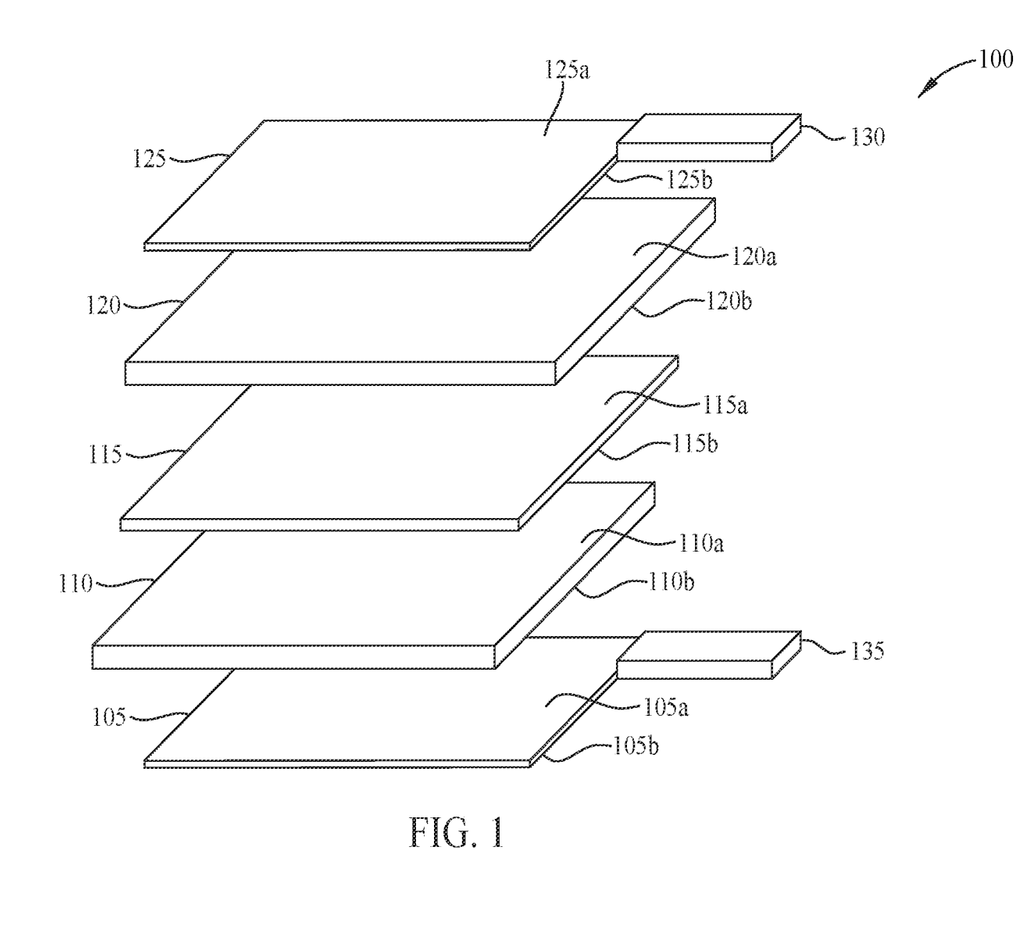
FIG. 1 is an exploded perspective view of an example battery according to at least one aspect of the present disclosure.

Aspects described herein generally relate to battery technology. FIG. 1 is an exploded perspective view of a battery 100 according to at least one aspect of the present disclosure. The battery 100 can be a lithium battery, such as a lithium metal anode based battery. In some aspects, the battery 100 can mitigate or even eliminate dendrite formation during and after battery cycling. As described above, cycling of conventional lithium batteries causes the formation of dendrites on one or more surfaces of various battery components such as lithium metal anodes. These dendrites can penetrate into separators of batteries, leading to poor Coulombic efficiency and low cycle life. In contrast, aspects of the battery 100 described herein can have improved Coulombic efficiency, cycle life, and improved safety relative to conventional lithium metal batteries.

The battery 100 includes a first current collector 105. As described further below, the first current collector 105 can include carbon nanotube(s), boron-nitride nanotube(s), an electrically conductive material such as aluminum, or combinations thereof. The current collector 105 has a top surface 105a and a bottom surface 105b. The battery 100 further includes a cathode 110 disposed on or over at least a portion of the first current collector 105. As shown in FIG. 1, a bottom surface 110b of the cathode 110 is disposed on or over at least a portion of the top surface 105a of the first current collector 105. The first current collector 105 can serve to collect electrons from the cathode 110 and to supply electrons to the cathode 110 during charge-discharge processes of the battery 100. A separator 115 is disposed on or over at least a portion of the cathode 110, such that a bottom surface 115b of the separator is disposed on or over at least a portion of the top surface 110a of the cathode 110. The battery 100 further includes an anode 120 having a bottom surface 120b, the bottom surface 120b of the anode 120 being disposed on or over at least a portion of a top surface 115a of the separator 115.

The battery 100 further includes a second current collector 125 having a top surface 125a and a bottom surface 125b. The bottom surface 125b of the second current collector 125 is disposed on or over at least a portion of a top surface 120a of the anode 120. The second current collector 125 can serve to collect electrons from the anode 120 and to supply electrons to the anode 120 during charge-discharge processes in the battery 100. As described below, the first current collector 105, the second current collector 125, or both, can include carbon nanotube(s), boron-nitride nanotube(s), an electrically conductive material (such as copper), or combinations thereof.

In some aspects, the battery 100 can further include a first tab 130 (also known as a lead) contacting an exposed surface of the second current collector 125 and a second tab 135 (also known as a lead) contacting an exposed surface of the first current collector 105. The first tab 130 can be soldered or fused to the first current collector 105, and the second tab 135 can be soldered or fused to the second current collector 125. Soldering or fusing of the first tab 130 to the first current collector 105 can be performed via a low-resistance contact formed between the first tab 130 and conductive component(s) of the first current collector 105. Soldering or fusing of the second tab 135 to the second current collector 125 can be performed in the same manner. Although not shown, the battery 100 can include one or more electrolytes.

The first current collector 105, the cathode 110, the separator 115, the anode 120, the second current collector 125 and other battery components are described further below.

Aspects described herein also generally relate to current collectors used for batteries including lithium batteries. Current collectors described herein, such as the first current collector 105 and the second current collector 125, can be in the form of an article such as a woven or a non-woven article. The woven and non-woven articles described herein, such as textiles, fabrics, sheets, webs, films, mats, aggregates, or other structures can be formed or patterned from a fiber, yarn, cable, wire, thread, or similar structures.

As used herein, the terms "fiber," "yarn," "cable," "wire," and "thread" are used interchangeably unless specified to the contrary or the context clearly indicates otherwise. Accordingly, use of the term "fiber" herein is intended to include fiber, yarn, cable, wire, thread, or a similar structure unless specified to the contrary or the context clearly indicates otherwise. As used herein, the terms "textile," "fabric," "sheet," "web," "film," "mat," and "aggregate," are used interchangeably unless specified to the contrary or the context clearly indicates otherwise. Accordingly, use of the term "textile" herein is intended to include textile, fabric, sheet, web, film, mat, aggregate, or a similar structure unless specified to the contrary or the context clearly indicates otherwise. The terms "electrically conductive material," "electrically conductive metal," and "electrically conductive metal alloy" are used interchangeably unless specified to the contrary or the context clearly indicates otherwise. Accordingly, use of the terms "electrically conductive material," "electrically conductive metal," and "electrically conductive metal alloy" is intended to include the other terms unless specified to the contrary or the context clearly indicates otherwise.

Briefly, a fiber described herein can include carbon nanotube(s) (CNT), boron-nitride nanotube(s) (BNNT), electrically conductive material, or combinations thereof. A plurality of such fibers can be weaved, interweaved, intertwined, entwined, knitted, merged, twisted, tangled, stitched, molded, or otherwise united together in the form of a woven or non-woven article such as a textile. The woven or non-woven article can be utilized as the current collector of a battery. Each of the one or more components—carbon nanotube(s), boron-nitride nanotube(s), electrically conductive material, or combinations thereof—can, individually, be in the form of a wire, a yarn, a cable, fiber, thread, or a similar structure. In some aspects, at least two of the CNT, the BNNT, or the electrically conductive material can be formed into a wire, a yarn, a cable, a fiber, or similar structures by coupling two or more of the CNT, the BNNT, or the electrically conductive material.

Generally, BNNTs comprise boron and nitrogen atoms substituting for carbon atoms of carbon nanotubes. The combination of one or more of a carbon nanotube, a boron-nitride nanotube, and an electrically conductive material can provide proper binding energy for Li atoms. In addition, the combination of one or more of a carbon nanotube, a boron-nitride nanotube, and an electrically conductive material can provide can provide high electrical and thermal conductivity. CNTs have been proposed as materials for current collectors, but the binding energy of Li atoms to CNT is about ~1.2-1.74 electronvolts (eV), while the Li cohesive energy is ~1.7 eV. In such circumstances, dendrite formation is energetically preferable. In contrast, the binding energy of Li atoms to BNNT is higher at about 1.6-1.9 eV. As described herein, the use of BNNT and CNT in desired proportions provides the proper binding energy for Li atoms that eliminates (or at least mitigates) dendrite formation.

In some aspects, the first current collector 105, the second current collector 125, or both, include a composite fiber or yarn that includes a first component comprising a carbon nanotube and a second component comprising a boron-nitride nanotube, wherein the first component is coupled to the second component. The composite yarn or fiber can further include a third component coupled to the first component, the second component, or both. The third component can include an electrically conductive metal, an electrically conductive metal alloy, or a combination thereof.

Current collectors, such as the first current collector 105 or the second current collector 125, can be in the form of an article such as a woven or non-woven article such as a textile. The current collector can include a single component such as an electrically conductive metal. Additionally, or alternatively, the current collector can include two components—a first component that includes CNT, BNNT, or both CNT and BNNT, and a second component that includes an electrically conductive metal. Additionally, or alternatively, the current collector can include three components—a first component that includes CNT, BNNT, or both CNT and BNNT, a second component that includes CNT, BNNT, or both CNT and BNNT, and a third component that includes an electrically conductive metal. The electrically conductive metal can take the form of a fiber, thread, or yarn that is weaved, interweaved, intertwined, entwined, knitted, merged, twisted, tangled, stitched, molded, or otherwise united together with a fiber made of CNT, BNNT, or both CNT and BNNT. Additionally, or alternatively, the electrically conductive metal can take the form of a particle or similar structure that is disposed on, deposited on, embedded in, or otherwise on or in, a surface, a pore, or other facet/structure of the fiber, thread, or yarn made of CNT, BNNT, or both CNT and BNNT.

Figure 2A:
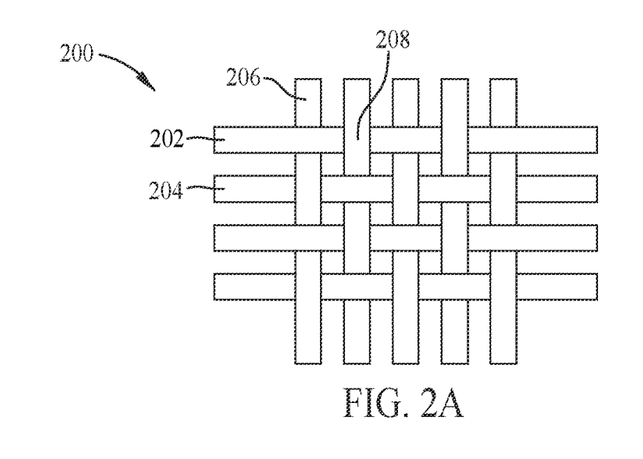
FIG. 2A is an illustration of example textile that can be included in example current collectors according to at least one aspect of the present disclosure.

FIG. 2A is an illustration of a textile 200 that can be used as, for example, at least a portion of a current collector, such as the first current collector 105 and/or the second current collector 125, according to at least one aspect of the present disclosure. The textile 200 includes a plurality of fibers. In some aspects, a first fiber 202 (or plurality of first fibers) can include CNT, BNNT, or both CNT and BNNT, and a second fiber 204 (or plurality of second fibers) can include CNT, BNNT, or both CNT and BNNT. The textile 200 can also include a third fiber 206 (or plurality of third fibers).

In some implementations, the first fiber 202 and second fiber 204 can correspond to different horizontal fibers of the textile 200 formed from a single fiber. In at least one implementation, the first fiber 202 and the second fiber 204 can correspond to distinct fibers. For example, the first fiber 202 can include CNT alone, and the second fiber 204 can include BNNT alone. In another example, the first fiber 202 can include CNT and BNNT in a first weight ratio of CNT to BNNT, and the second fiber 204 can include CNT and BNNT in a second weight ratio of CNT to BNNT that is the same or different from the first ratio.

The vertical fibers (for example, third fiber 206) can include an electrically conductive material (for example, an electrically conductive metal, an electrically conductive metal alloy, other electrically conductive material, or combinations thereof). In some aspects, the electrically conductive material comprises copper, aluminum, nickel, platinum, zinc, titanium, stainless steel, sintered carbon, or combinations thereof. As illustrated, the third fiber 206 can correspond to a wire that is made of, or includes, the electrically conductive material. In some implementations, the third fiber 206 can correspond to different vertical fibers of the textile 200 formed from a single fiber. In at least one implementation, third fiber 206 can correspond to distinct fibers.

In some aspects, one or more first fibers 202, one or more second fibers 204, one or more third fibers 206, or combinations thereof, can be weaved, interweaved, intertwined, entwined, knitted, merged, twisted, tangled, or otherwise united together to form the article such as textile 200. One or more first fibers 202, one or more second fibers 204, or combinations thereof, may be coupled to or substantially coupled to (for example, attached to, substantially attached to, contacting, or nearly contacting) one or more third fibers 206 at one or more coupling points 208. Only one coupling point 208 is identified for clarity. In some aspects, coupling may be performed by weaving, welding (for example, laser welding), adhesive (for example, with a cyanoacrylate adhesive or an epoxy-based adhesive), or combinations thereof. In some aspects which can be combined with other aspects, individual fibers (tubes) can be attached to each other by Van der Waals interactions and can be in the form of bundles. Bundles may be attached to other bundles and/or other fibers by mechanical reinforcement depending on the weaving or knitting style.

In some aspects, vertical fibers (for example, third fiber 206) may pass over and/or under a single fiber or a group of fibers. For example, the third fiber 206 can pass over or under a single first fiber 202 or a plurality of first fibers 202 before passing over and/or under a single second fiber 204 or a plurality of second fibers 204. In the example illustrated in FIG. 2A, the third fiber 206 passes under a portion of the first fiber 202 then passes over a portion of the second fiber 204. A vertical fiber (not labeled) adjacent to third fiber 206 first passes over a portion of the first fiber 202 then passes under a portion of the second fiber 204. In other examples, vertical fibers (for example, third fiber 206) may alternate between passing over and under the horizontal fibers (for example, first fiber 202 and second fiber 204) and at different intervals. In the illustrated example, the third fiber 206 is coupled to (for example, attached to, contacting, or nearly contacting) the first fiber 202 and the second fiber 204. In some aspects, vertical fibers (for example, third fiber 206) may be coupled to (for example, attached to, contacting, or nearly contacting) some but not all horizontal fibers (for example, the first fiber 202 and the second fiber 204). For example, a particular vertical fiber may be attached to every second, third, fourth, fifth, sixth, seventh, eighth, ninth, tenth, and so forth, horizontal fiber.

In at least one aspect, adjacent vertical fibers may pass to the same side of horizontal fibers. For example, the third fiber 206 can pass over the first fiber 202 and the second fiber 204. In other implementations, adjacent vertical fibers may traverse a common horizontal fiber differently (for example, one vertical fiber may pass over the common horizontal fiber while the other passes under the common horizontal fiber). In some examples, adjacent vertical fibers are separated and/or in contact with each other. In at least one example, adjacent horizontal fibers are separated and/or in contact with each other. Various weaving configurations are discussed below and shown in FIG. 3.

Individual fibers can include CNT, BNNT, or a combination thereof. For example, a fiber described herein can include about 100 wt % or less CNT based on a total weight of CNT and BNNT of the fiber. As another example, a fiber described herein can include about 100 wt % or less BNNT based on a total weight of CNT and BNNT of the fiber. In some aspects, a fiber described herein can include an amount of BNNT of about 20 wt % or more and/or about 99 wt % or less, such as from about 25 wt % to about 95 wt %, such as from about 30 wt % to about 90 wt %, such as from about 35 wt % to about 85 wt %, such as from about 40 wt % to about 80 wt %, such as from about 45 wt % to about 75 wt %, such as from about 50 wt % to about 70 wt %, such as from about 55 wt % to about 65 wt %, based on a total weight of CNT and BNNT in the fiber. Other amounts are contemplated.

Individual textiles or similar structures described herein can include CNT, BNNT, or a combination thereof. For example, a textile described herein can include about 100 wt % or less CNT based on a total weight of CNT and BNNT of the textile or similar structure. As another example, a textile or similar structure described herein can include about 100 wt % or less BNNT based on a total weight of CNT and BNNT of the textile or similar structure. In some aspects, a textile or similar structure described herein can include an amount of BNNT of about 20 wt % or more and/or 100 wt % or less, such as from about 20 wt % to about 99 wt %, such as from about 25 wt % to about 95 wt %, such as from about 30 wt % to about 90 wt %, such as from about 35 wt % to about 85 wt %, such as from about 40 wt % to about 80 wt %, such as from about 45 wt % to about 75 wt %, such as from about 50 wt % to about 70 wt %, such as from about 55 wt % to about 65 wt %, based on a total weight of CNT and BNNT in the textile or similar structure. Other amounts are contemplated.

A fiber described herein can include about 0.05 wt % or more, such as from about 0.05 wt % to about 100 wt % of electrically conductive material (for example, electrically conductive metal(s), electrically conductive metal alloy(s), other electrically conductive material(s), and combinations thereof) based on a total weight of the CNT, BNNT, and electrically conductive material in the fiber. The amount of electrically conductive material can depend on the electrical conductivity percolation threshold of the fiber materials and on the aspect ratio (diameter versus length of the CNT or BNNT). For example, when a CNT is utilized, about 0.05 wt % of the electrically conductive material (based on a total weight of the CNT, BNNT, and electrically conductive material in the fiber) can be sufficient to have a conductive material. In some examples, and when the electrically conductive material is in the form of particles, the amount of electrically conductive material in the fiber, based on the total weight of the CNT, BNNT, and electrically conductive material in the fiber, can be from about 0.05 wt % to about 100 wt %, such as from about 1 wt % to about 99 wt %, such as from about 5 wt % to about 98 wt %, such as from about 10 wt % to about 90 wt %, such as from about 20 wt % to about 80 wt %, such as from about 30 wt % to about wt %, such as from about 40 wt % to about 60 wt %, such as from about 45 wt % to about 55 wt %. Other amounts are contemplated. In some examples, and when the electrically conductive material is in the form of a wire, porous mesh, or similar structure, the amount of electrically conductive material in the fiber, based on the total weight of the CNT, BNNT, and electrically conductive material in the fiber, can be from about 5 wt % to about 100 wt %, such as from about 10 wt % to about 90 wt %, such as from about 20 wt % to about 80 wt %, such as from about 30 wt % to about 70 wt %, such as from about 40 wt % to about 60 wt %, such as from about 45 wt % to about 55 wt %. Other amounts are contemplated.

In some aspects, textiles or similar structures described herein can include about 0.05 wt % or more, such as from about 0.05 wt % to about 100 wt % of electrically conductive material (for example, electrically conductive metal(s), electrically conductive metal alloy(s), other electrically conductive material(s), and combinations thereof) based on a total weight of CNT, BNNT, and electrically conductive material in the textile or similar structure. In some examples, and when the electrically conductive material is in the form of particles, the amount of electrically conductive material in the textile or similar structure, based on the total weight of the CNT, BNNT, and electrically conductive material in the textile or similar structure, can be from about 0.05 wt % to about 100 wt %, such as from about 1 wt % to about 99 wt %, such as from about 5 wt % to about 98 wt %, such as from about 10 wt % to about 90 wt %, such as from about 20 wt % to about 80 wt %, such as from about 30 wt % to about 70 wt %, such as from about 40 wt % to about 60 wt %, such as from about 45 wt % to about 55 wt %. Other amounts are contemplated. In some examples, and when the electrically conductive material is in the form of a wire, porous mesh, or similar structure, the amount of electrically conductive material in the textile or similar structure, based on the total weight of the CNT, BNNT, and electrically conductive material in the textile or similar structure, can be from about 5 wt % to about 100 wt %, such as from about 10 wt % to about 90 wt %, such as from about 20 wt % to about 80 wt %, such as from about 30 wt % to about 70 wt %, such as from about 40 wt % to about 60 wt %, such as from about 45 wt % to about 55 wt %. Other amounts are contemplated.

The electrically conductive material (for example, electrically conductive metal, electrically conductive metal alloy, other electrically conductive material, or combinations thereof) can include copper, aluminum, nickel, platinum, zinc, titanium, stainless steel, sintered carbon, or combinations thereof. In some aspects, the first current collector 105—which is the current collector for the cathode 110—comprises aluminum as an electrically conductive material; the second current collector 125—which is the current collector for the anode 120—comprises copper as an electrically conductive material; and combinations thereof.

Aspects and implementations described herein such as weaving configurations, amount of CNT, amount of BNNT, amount of electrically material, coupling of various fibers, et cetera (for example, some or all of those aspects and implementations described with reference to FIG. 2B, FIG. 2C, and FIG. 3) can be utilized for textile 200.

Figure 2B:
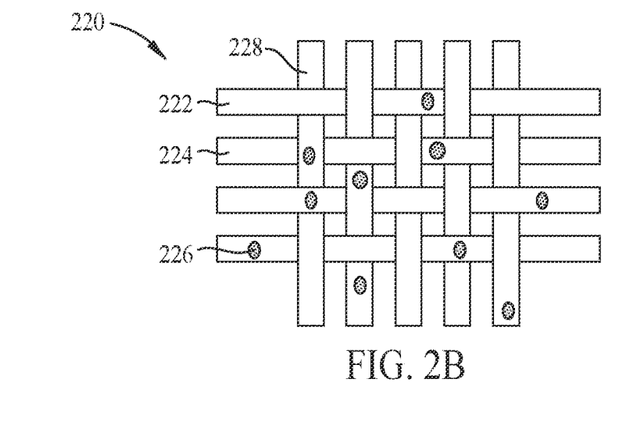
FIG. 2B is an illustration of another example textile that can be included in example current collectors according to at least one aspect of the present disclosure.

FIG. 2B is an illustration of a textile 220 that can be used as, for example, at least a portion of a current collector, such as the first current collector 105 and/or the second current collector 125, according to at least one aspect of the present disclosure. The textile 220 includes a plurality of fibers. In some aspects, a first fiber 222 (or plurality of first fibers) can include CNT and/or BNNT, and a second fiber 224 (or plurality of second fibers) can include CNT and/or BNNT. The textile 220 can also include a third fiber 228 (or plurality of third fibers) that can includes CNT and/or BNNT. The textile 220 further includes a particle 226 (or plurality of particles) that include an electrically conductive material. In some aspects, the electrically conductive material comprises copper, aluminum, nickel, platinum, zinc, titanium, stainless steel, sintered carbon, or combinations thereof. The particle 226, or plurality of particles, are disposed on, deposited on, embedded in, dispersed on or in, or otherwise on or in a surface, a pore, or other facet/structure of the fibers made of CNT and/or BNNT.

In some implementations, the first fiber 222 and the second fiber 224 can correspond to different horizontal fibers of the textile 220 formed from a single fiber. In at least one implementation, the first fiber 222 and the second fiber 224 can correspond to distinct fibers. The vertical fiber, for example, the third fiber 228, can correspond to different vertical fibers of the textile 220 formed from a single fiber. In at least one implementation, the third fiber 228 can correspond to distinct fibers. In some aspects, one or more first fibers 222, one or more second fibers 224, one or more third fibers 228, or combinations thereof, can be weaved, interweaved, intertwined, entwined, knitted, merged, twisted, tangled, or otherwise united together to form the article such as the textile 220.

In some examples, the one or more first fibers 222 can include CNT alone, the one or more second fibers 224 can include BNNT alone, and/or the one or more third fibers 228 can include both CNT and BNNT. Other iterations are contemplated. For example, the one or more first fibers 222 can include CNT and BNNT, the one or more second fibers 224 can include CNT alone, and/or the one or more third fibers 228 can include BNNT.

In some aspects, the one or more first fibers 222 can include CNT and BNNT having a first amount of BNNT, the one or more second fibers 224 can include CNT and BNNT in a second amount of BNNT, and/or the one or more third fibers 228 can include CNT and BNNT in a third amount of BNNT, where the first amount, the second amount, and the third amount can be the same or different. Aspects and implementations described herein such as weaving configurations, amount of CNT, amount of BNNT, amount of electrically conductive material, coupling of various fibers, et cetera (for example, some or all of those aspects and implementations described with reference to FIG. 2B, FIG. 2C, and FIG. 3) can be utilized for textile 220.

Figure 2C:
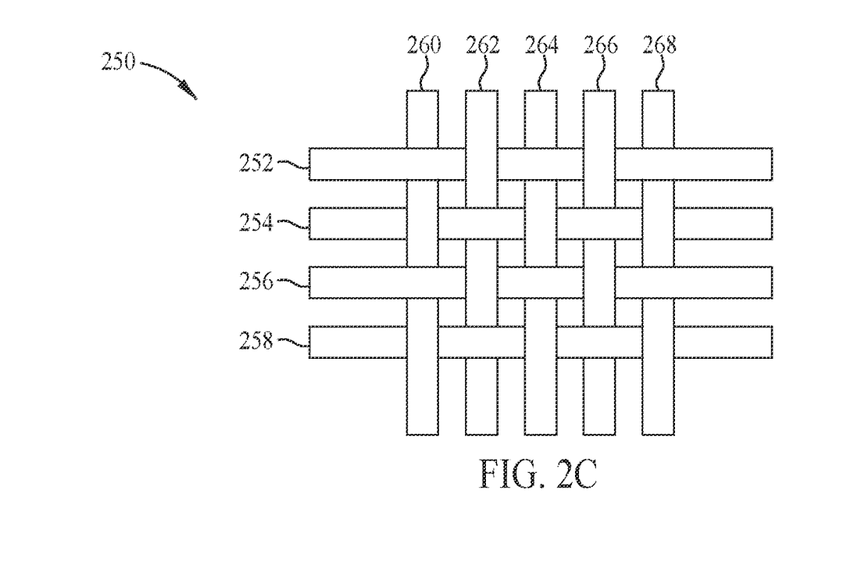
FIG. 2C is an illustration of another example textile that can be included in example current collectors according to at least one aspect of the present disclosure.

FIG. 2C is an illustration of a textile 250 that can be used as, for example, at least a portion of a current collector described herein, such as the first current collector 105, the second current collector 125, or both, according to at least one aspect of the present disclosure. The textile 250 includes a plurality of horizontal fibers and a plurality of vertical fibers. In some aspects, a first fiber 252 (or plurality of first fibers) can include CNT, BNNT, or both CNT and BNNT, a second fiber 254 (or plurality of second fibers) can include CNT, BNNT, or both CNT and BNNT, a third fiber 256 (or plurality of third fibers), and a fourth fiber 258 (or plurality of fourth fibers). Additionally, or alternatively, one or more of the first fiber 252, second fiber 254, third fiber 256, or the fourth fiber 258 can, individually, include an electrically conductive material in the form of, for example, an electrically conductive fiber or wire, or as electrically conductive particle(s), such as metal wires or metal particles. In some aspects, the electrically conductive material comprises copper, aluminum, nickel, platinum, zinc, titanium, stainless steel, sintered carbon, or combinations thereof.

The textile 250 can also include a fifth fiber 260 (or plurality of fifth fibers) can include CNT, BNNT, or both CNT and BNNT, a sixth fiber 262 (or plurality of sixth fibers) can include CNT, BNNT, or both CNT and BNNT, a seventh fiber 264 (or plurality of seventh fibers), an eighth fiber 266 (or plurality of eighth fibers), and a ninth fiber 268 (or plurality of eighth fibers). Additionally, or alternatively, one or more of the fifth fiber 260, sixth fiber 262, seventh fiber 264, eighth fiber 266, or ninth fiber 268 can, individually, include an electrically conductive material in the form of a fiber or wire or as a particle(s). Additionally, or alternatively, the textile 250 can include a particle or plurality of particles (not shown) that includes an electrically conductive metal, electrically conductive metal alloy, or combinations thereof. The particle(s) can be disposed on, deposited on, embedded in, dispersed on or in, or otherwise on or in a surface, a pore, or other facet/structure of the fibers made of CNT, BNNT, and/or electrically conductive material.

Aspects and implementations described herein such as weaving configurations, amount of CNT, amount of BNNT, amount of electrically conductive materials, coupling of various fibers, et cetera (for example, some or all of those aspects and implementations described with reference to FIG. 2B, FIG. 2C, and FIG. 3) can be utilized for textile 250.

In some implementations, the first fiber 252, the second fiber 254, the third fiber 256, the fourth fiber 258, or combinations thereof can correspond to different horizontal fibers of the textile 250 formed from a single fiber. In at least one implementation, the first fiber 252, the second fiber 254, the third fiber 256, the fourth fiber 258, or combinations thereof can correspond to distinct fibers. The vertical fibers—the fifth fiber 260, the sixth fiber 262, the seventh fiber 264, the eighth fiber 266, the ninth fiber 268, or combinations thereof—can correspond to different vertical fibers of the textile 250 formed from a single fiber. In at least one implementation, the fifth fiber 260, the sixth fiber 262, the seventh fiber 264, the eighth fiber 266, the ninth fiber 268, or combinations thereof can correspond to distinct fibers. In some aspects, one or more of the first fiber 252, the second fiber 254, the third fiber 256, the fourth fiber 258, the fifth fiber 260, the sixth fiber 262, the seventh fiber 264, the eighth fiber 266, or the ninth fiber 268 can be weaved, interweaved, intertwined, entwined, knitted, merged, twisted, tangled, or otherwise united together to form the article such as textile 250.

One or more implementations or aspects of FIG. 2A can be used with one or more implementations or aspects of FIG. 2B and/or FIG. 2C; one or more implementations or aspects of FIG. 2B can be used with one or more implementations or aspects of FIG. 2A and/or FIG. 2C; and one or more implementations or aspects of FIG. 2C can be used with one or more implementations or aspects of FIG. 2A and/or FIG. 2B. For example, electrically conductive metal particles can be disposed on, deposited on, embedded in, dispersed on or in, or otherwise on or in a surface, a pore, or other facet/ structure of the first fiber 202 and/or the second fiber 204. As another example, the third fiber 206 (for example, a metal wire) may be used with the textile 220 or the textile 250.

In some aspects, at least two of the fibers can be used to form a non-woven textile, such as a non-woven textile where the fibers are randomly tangled with one another.

Figure 3:
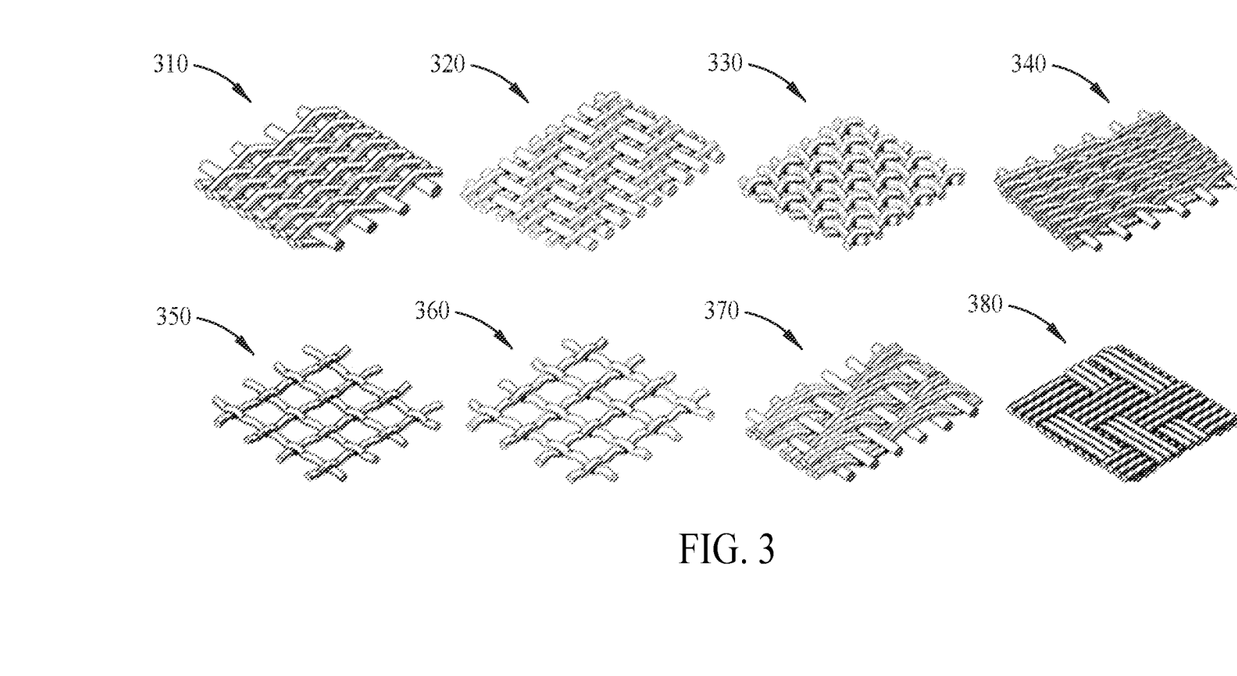
FIG. 3 shows example weaving configurations that can be used for textiles described herein according to at least one aspect of the present disclosure.

FIG. 3 shows various weaving configurations or patterns that can be used for the textiles described herein, for example, textiles 200, 220, and 250. The various weaving configurations can enable, for example, control over porosity and/or density of the textiles. Illustrative, but non-limiting, examples of configurations can include a plain Dutch weave 310, a twill weave 320, a plain weave 330, a twill Dutch weave 340, a lock crimp weave 350, an intercrimp weave 360, a twill Dutch double weave 370, a stranded weave 380, or combinations thereof. Other weave configurations or patterns are contemplated.

With respect to plain weaves, a horizontal fiber runs perpendicular to a vertical fiber. The gaps between the fibers can be square, substantially square, rectangular, or substantially rectangular depending on the proximity of each horizontal fiber is to neighboring fibers. Twill weaves typically have fibers running over and under adjacent fibers in multiples. A basic twill weave may have a horizontal fiber running over then under two vertical fibers at a time with the first double offset by one vertical fiber at the beginning of each pass. Twill weaves can additionally, or alternatively, include more complex patterns as desired.

Dutch weaves and stranded weaves, are also contemplated. Dutch weaves and stranded weaves can have a tighter mesh than the other weave configurations. Dutch weaves can have the vertical fibers with a larger diameter than the horizontal fibers. The larger diameter vertical fibers can enable the horizontal fibers to compress more closely. With respect to stranded weaves, several strands of fibers comprise each length of vertical fiber and horizontal fiber.

The horizontal fibers described herein can be weft fibers or warp fibers; the vertical fibers described herein can be weft fibers or warp fibers. Typically, the lengthwise or longitudinal warp fibers are held stationary in tension on a frame or loom while the transverse weft fibers are drawn through and inserted over and/or under the warp fibers.

One or more of the individual fibers used to form the configurations or patterns of at least a portion of textiles 200, 220, and 250 described herein can include CNT, BNNT, and/or electrically conductive metal(s)/metal alloy(s). Additionally, or alternatively, particle(s) comprising electrically conductive metal(s)/metal alloy(s) can be disposed on, deposited on, embedded in, dispersed on or in, or otherwise on or in a surface, a pore, or other facet/structure of the one or more fibers.

A thickness of the current collector (for example, the first current collector 105 and the second current collector 125) can be about 1,000 µm or less, such as about 500 µm or less, such as about 400 µm or less, such as about 300 µm or less, such as about 200 µm or less, such as about 100 µm or less. A higher or lower thickness of the current collector is contemplated. The thickness of the current collector can be adjusted based on the resistance to current or mechanical strength desired.

The CNT useful in current collectors described herein (for example, the first current collector 105, the second current collector 125, or both) can be a single-walled carbon nanotube, a few-walled carbon nanotube, a multi-walled carbon nanotube, a double-wall carbon nanotube, or combinations thereof. These carbon nanotubes can be doped or non-doped. Single-walled carbon nanotubes can be synthesized according to known methods. Few-walled, double-walled, and multi-walled carbon nanotubes can be synthesized, characterized, co-deposited, and collected using any suitable method and apparatus known, including those used for single-walled carbon nanotubes. The carbon nanotubes can range in length from about 50 nm to about 10 cm or greater, though longer or shorter carbon nanotubes are contemplated. Diameters of the carbon nanotubes can range from about 1 nm to about 10 nm, though carbon nanotubes of longer or shorter diameters are contemplated. The carbon nanotube can be partially cylindrical, substantially cylindrical, or cylindrical. The carbon nanotubes can be partially hollow, substantially hollow, or hollow. Various other suitable carbon nanotubes are contemplated.

The BNNT useful in current collectors described herein (for example, the first current collector, the second current collector 125, or both) can be a single-walled boron-nitride nanotube, a few-walled boron-nitride nanotube, a multi-walled boron-nitride nanotube, a double-wall boron-nitride nanotube, or combinations thereof. These boron-nitride nanotubes can be doped or non-doped. Single-walled boron-nitride nanotubes can be synthesized according to known methods. Few-walled nanotubes, double-walled, and multi-walled boron-nitride can be synthesized, characterized, co-deposited, and collected using any suitable method and apparatus known, including those used for single-walled boron-nitride nanotubes. The boron-nitride nanotubes can range in length from about 50 nm to about 10 cm or greater, though longer or shorter carbon nanotubes are contemplated. Diameters of the boron-nitride nanotubes can range from about 1 nm to about 10 nm, though boron-nitride nanotubes of longer or shorter diameters are contemplated. The boron-nitride nanotubes can be partially cylindrical, substantially cylindrical, or cylindrical. The boron-nitride nanotubes can be partially hollow, substantially hollow, or hollow. Various other suitable boron-nitride nanotubes are contemplated.

The cathode 110 can include a composite material that includes cathode active material (such as lithium metal oxide, lithium metal, et cetera, or combinations thereof) in the form of, for example, particles. The composite material of the cathode 110 can further include a three-dimensional cross-linked network of carbon nanotubes. According to some aspects, the three-dimensional cross-linked network of carbon nanotubes can have a webbed morphology, a non-woven, non-regular, or non-systematic morphology, or combinations thereof.

Metals in lithium metal oxides of the cathode 110 according to the present disclosure may include, but are not limited to, one or more alkali metals, alkaline earth metals, transition metals, aluminum, or post-transition metals, and hydrates thereof. Non-limiting examples of lithium metal oxides include lithiated oxides of Ni, Mn, Co, Al, Mg, Ti, alloys thereof, or combinations thereof. In an illustrative example, the lithium metal oxide is lithium nickel manganese cobalt oxide ($LiNi_xMn_yCo_zO_2$, x+y+z=1), Li(Ni,Mn,Co)$O_2$, or Li—Ni—Mn—Co—O. The lithium metal oxide can be in the form of a powder. The lithium metal oxide powder can have a particle size defined within a range between about 1 nanometer (nm) and about 100 microns (μm), or any integer or subrange in between. In a non-limiting example, the lithium metal oxide particles have an average particle size of about 1 μm to about 10 μm. In some aspects, an active material for the cathode 110 can include $LiFePO_4$, $LiCoO_2$, Li—Ni—Mn—Co—O, or combinations thereof. Other materials for the cathode 110 and the cathode active material are contemplated.

The anode 120 can include a composite material that includes lithium metal in the form of, for example, particles. The composite material of the anode 120 can include an anode active material (such as graphite, silicon, a porous material that matches or substantially matches the potential of the given cathode material, natural graphite, artificial graphite, activated carbon, carbon black, high-performance powdered graphene, et cetera, and combinations thereof). The composite material of the anode 120 can further include carbon nanotubes in the form of a three-dimensional cross-linked network. In some aspects, the anode active material of the anode 120 can include Si, SiOx/C, graphite, or combinations thereof. Other materials for the anode 120 and the anode active material are contemplated.

Various separators can be used with aspects described herein. The separator 115 can be single ply or multi-ply. The separator 115 can include at least one layer composed of or including one or more polymers. Suitable materials useful for the separator 115 include those known to persons of ordinary skill in the art for use in between battery anodes and cathodes, to provide a barrier between the anode and the cathode while enabling the exchange of lithium ions from one side to the other, such as a membranous barrier or a separator membrane. The separator membrane can be permeable to lithium ions, allowing them to travel from the cathode side to the anode side and back during the charge-discharge cycle. The separator membrane can be impermeable to anode and cathode materials, preventing them from mixing, touching, and shorting the battery. The separator membrane can also serve as an electrical insulator for metal parts of the battery (leads, tabs, metal parts of the enclosure, et cetera) preventing them from touching and shorting.

Illustrative, but non-limiting, examples of suitable materials that can be used the one or more polymers of the separator 115 include polyolefins such as polypropylene, polyethylene, polyimidazoles, polybenzimidazole (PBI), polyimides, polyamideimides, polyaramids, polysulfones, polyvinylidene fluoride, aromatic polyesters, polyketones, polytetrafluoroethylene (PTFE), blends thereof, mixtures thereof, and combinations thereof. Commercial polymer separators include, for example, the Celgard™ line of separators.

In some aspects, the separator 115 is a thin (about 15-25 μm) polymer membrane (tri-layer composite: polypropylene-polyethylene-polypropylene, commercially available) between two relatively thick (about 20-1000 μm) porous electrode sheets. The thin polymer membrane may be about 15-25 μm thick, such as 15-23, 15-21, 15-20, 15-18, 15-16, 16-25, 16-23, 16-21, 16-20, 16-18, 18-25, 18-23, 18-21, 18-20, 20-25, 20-23, 20-21, 21-25, 21-23, 23-25, 15, 16, 17, 18, 19, 20, 21, 22, 23, 24, or 25 μm thick, or any integer or subrange in between. The two relatively thick porous electrode sheets may each independently be 50-500 μm thick, such as 50-450 μm, 50-400 μm, 50-350 μm, 50-300 μm, 50-250 μm, 50-200 μm, 50-150 μm, 50-100 μm, 50-75 μm, 50-60 μm, 50-55 μm, 55-500 μm, 55-450 μm, 55-400 μm, 55-350 μm, 55-300 μm, 55-250 μm, 55-200 μm, 55-150 μm, 55-100 μm, 55-75 μm, 55-60 μm, 60-500 μm, 60-450 μm, 60-400 μm, 60-350 μm, 60-300 μm, 60-250 μm, 60-200 μm, 60-150 μm, 60-100 μm, 60-75 μm, 75-500 μm, 75-450 μm, 75-400 μm, 75-350 μm, 75-300 μm, 75-250 μm, 75-200 μm, 75-150 μm, 75-100 μm, 100-500 μm, 100-450 μm, 100-400 μm, 100-350 μm, 100-300 μm, 100-250 μm, 100-200 μm, 100-150 μm, 150-500 μm, 150-450 μm, 150-400 μm, 150-350 μm, 150-300 μm, 150-250 μm, 150-200 μm, 200-500 μm, 200-450 μm, 200-400 μm, 200-350 μm, 200-300 μm, 200-250 μm, 250-500 μm, 250-450 μm, 250-400 μm, 250-350 μm, 250-300 μm, 300-500 μm, 300-450 μm, 300-400 μm, 300-350 μm, 350-500 μm, 350-450 μm, 350-400 μm, 400-500 μm, 400-450 μm, 450-500 μm, 50 μm, 55 μm, 60 μm, 75 μm, 100 μm, 150 μm, 200 μm, 250 μm, 300 μm, 350 μm, 400 μm, 450 μm, or 500 μm, or any integer or subrange in between. Other dimensions and materials for the separator 115 are contemplated.

Any suitable electrolyte can be used with aspects described herein. In some aspects, the electrolyte can include a liquid electrolyte, a solid electrolyte, a gel electrolyte, a polymer ionic liquid. In at least one aspect, the gel electrolyte can be any suitable gel electrolyte known in the art. For example, the gel electrolyte can include a polymer and a polymer ionic liquid. For example, the polymer can be a solid graft (block) copolymer electrolyte. In some aspects, the solid electrolyte can be, for example, an organic solid electrolyte or an inorganic solid electrolyte. Non-limiting examples of the organic solid electrolyte can include polyethylene derivatives, polyethylene oxide derivatives, polypropylene oxide derivatives, phosphoric acid ester polymer, polyester sulfide, polyvinyl alcohol, polyfluoride vinylidene, and polymers including ionic dissociative groups. A combination comprising at least one of the foregoing can also be used.

When a liquid electrolyte is utilized, the liquid electrolyte can be a non-aqueous liquid electrolyte, aqueous liquid electrolyte, or a combination thereof. The non-aqueous liquid electrolyte can include an electrolyte salt and a non-aqueous solvent. Illustrative, but non-limiting, examples include propylene carbonate, ethylene carbonate, vinylene carbonate, dimethyl carbonate, ethyl methyl carbonate, diethyl carbonate, methyl propyl carbonate, isopropyl methyl carbonate, ethyl propionate, methyl propionate, γ-butyrolactone, ethyl acetate, methyl acetate, tetrahydrofuran, 2-methyltetrahydrofuran, ethylene glycol dimethyl ether, ethylene glycol diethyl ether, acetonitrile, dimethyl sulfoxide, diethoxyethane, 1,1-dimethoxyethane, tetraethylene glycol dimethyl ether, and combinations thereof.

An ionic liquid can be used as the non-aqueous solvent. Examples of ionic liquids can include aliphatic quaternary ammonium salts such as N,N,N-trimethyl-N-propylammonium bis(trifluoromethanesulfonyl)amide, N-methyl-N-propylpiperidinium bis(trifluoromethanesulfonyl)amide, N-methyl-N-propylpyrrolidinium bis(trifluoromethanesulfonyl)amide, N-methyl-N-butylpyrrolidinium bis(trifluoromethanesulfonyl)amide, and N,N-diethyl-N-methyl-N-(2-methoxyethyl)ammonium bis(trifluoromethanesulfonyl)amide; and alkylimidazolium quaternary salts such as 1-methyl-3-ethylimidazolium tetrafluoroborate, 1-methyl-3-ethylimidazolium bis(trifluoromethanesulfonyl)amide, 1-allyl-3-ethylimidazolium bromide, 1-allyl-3-ethylimidazolium tetrafluoroborate, 1-allyl-3-ethylimidazolium bis(trifluoromethanesulfonyl)amide, 1,3-diallylimidazolium bromide, 1,3-diallylimidazolium tetrafluoroborate, 1,3-diallylimidazolium bis(trifluoromethanesulfonyl)amide, and combinations thereof.

The electrolyte salt can be soluble in non-aqueous solvents and able to exhibit desired ion conductivity. For example, a metal salt containing a metal ion desired to be conducted, can be used as the electrolyte salt. For example, lithium salts can be used as the electrolyte salt. For example, lithium salts such as $LiPF_6$, $LiBF_4$, $LiClO_4$, $LiAsF_6$, LiOH, LiCl, $LiNO_3$ and $Li_2SO_4$; and organic lithium salts such as $CH_3CO_2Li$, lithium bis(oxalate)borate (LiBOB), $LiN(CF_3SO_2)_2$ (LiTFSA), $LiN(C_2F_5SO_2)_2$(LiBETA), and/or $LiN(CF_3SO_2)(C_4F_9SO_2)$ can be utilized.

The content the electrolyte salt relative to the non-aqueous solvent in the non-aqueous liquid electrolyte can be appropriately determined depending on the combination of the solvent and the electrolyte salt. The non-aqueous liquid electrolyte may be used in the form of gel by adding a polymer thereto. Examples of methods for gelation of the non-aqueous liquid electrolyte, include a method of adding a polymer such as polyethylene oxide (PEO), polyacrylonitrile (PAN), polyvinylidene fluoride (PVDF) or polymethyl methacrylate (PMMA) to the non-aqueous liquid electrolyte.

Examples of the aqueous liquid electrolyte can include alkaline aqueous solutions such as potassium hydroxide aqueous solution and/or sodium hydroxide aqueous solution. Examples of the aqueous liquid electrolyte can include acidic aqueous solutions such as hydrochloric acid solution, nitric acid solution, and/or sulfuric acid solution. The aqueous liquid electrolyte can be appropriately selected, depending on, for example, the type of the anode active material.

Solid electrolyte can be utilized. Non-limiting examples of the solid electrolyte include inorganic solid electrolytes such as a solid sulfide electrolyte and/or a solid oxide electrolyte. The inorganic solid electrolyte can be in the form of glass, crystal, and/or glass ceramic.

Solid sulfide electrolytes contain sulfur (S) and are ion-conductive. Non-limiting examples of solid sulfide electrolyte materials can include $Li_2S$—$P_2S_5$ ($Li_2S:P_2S_5$=50:50 to 100:0), $Li_2S$—$P_2S_5$—LiI, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (Z=Ge, Zn, Ga), $Li_2S$—$GeS_2$, $Li_2S$—$SiS_2$—$Li_3PO_4$, and/or $Li_2S$—$SiS_2$—$Li_xMO_y$, (M=P, Si, Ge, B, Al, Ga, In). Solid oxide electrolytes include LiPON (lithium phosphorus oxynitride), LiAlTi type (for example, $Li_{1.3}Al_{0.3}Ti_{0.7}(PO_4)_3$), LaLiTi type (for example, $La_{0.51}Li_{0.34}TiO_{0.74}$), $Li_3PO_4$, $Li_2SiO_2$, and/or $Li_2SiO_4$. Other materials for the electrolyte are contemplated. Combinations of various electrolytes can be used.

Textiles described herein, such as textile 200, textile 220, and textile 250, can be made by various suitable methods. These textiles can serve as a current collector for the cathode 110, the anode 120, or both. For example, textile 200 can be the second current collector 125 for the anode 120 and/or the first current collector 105 for the cathode 110. As another example, the second current collector 125 can include one or more of textile 200, textile 220, or textile 250.

Carbon nanotubes and boron-nitride nanotubes can be purchased commercially or synthesized by methods known in the art. See, e.g., U.S. Pat. No. 10,850,984 (carbon nanotubes) and U.S. Pat. No. 8,206,674 (boron-nitride nanotubes), each of which is incorporated herein by reference in its entirety.

For example, carbon nanotubes can be made according to the following non-limiting procedure. A catalyst supported on powdered oxides can be contacted with the carbon source at suitable reaction temperatures, or the catalysts supported on the oxide powder can be aerosolized and introduced into a reactor maintained at a suitable reaction temperature. Concurrently, a carbon precursor gas can be introduced into the reactor. The flow of reactants within the reactor can be controlled such that the deposition of the carbon products on the walls of the reactor is reduced. The carbon nanotubes thus produced can be collected and separated. Other suitable methods for forming CNTs are contemplated. Boron-nitride nanotubes can be made according to the following non-limiting procedure: (a) forming a source of boron vapor; (b) mixing the boron vapor with nitrogen gas so that a mixture of boron vapor and nitrogen gas is present at a nucleation site, the nitrogen gas being provided at a pressure which is, for example, greater than about 2 atm. but less than about 250 atm.; and (c) collecting the boron-nitride nanotubes which are formed at the nucleation site. Other suitable methods for forming BNNTs are contemplated.

Carbon nanotubes can be formed into fibers or threads by suitable methods. In some aspects, carbon nanotubes can be made by continuous removal of a CNT product from a reactor and spinning the CNT into a CNT thread. The diameter of the thread can depend on, for example, number of the tubes that has been removed from the reactor and spun. Alternatively, carbon nanotubes can be made by a post-synthesis dispersion of a CNT into a solution (for example, a superacid), followed by extrusion from a narrow funnel. Here, the neck of the funnel can define the diameter of the thread. Alternatively, carbon nanotubes can be formed by growing a CNT "forest" (vertically aligned dense carbon nanotubes) on a substrate (for example, $SiO_2$) followed by spinning of the thread from the forest.

Boron-nitride nanotubes can be formed into fibers or threads by suitable methods. See, e.g., U.S. Pat. Nos. 10,850,948 and 10,458,049, each of which is incorporated herein by reference in its entirety. In some aspects, boron-nitride nanotubes can be made by continuous removal of a BNNT product from a reactor and spinning the BNNT into a BNNT thread. The diameter of the thread can depend on, for example, number of the tubes that has been removed from the reactor and spun.

In one example, BNNT threads can be made according to the following non-limiting procedure. Continuous BNNTs can be first produced using gas phase pyrolysis and a catalyst. The catalyst can be unanchored and can flow with a carrier gas. In this way, BNNTs can be grown unanchored to a substrate. Suitable boron, nitrogen, and catalyst source compounds can be sublimed or dispersed into a gas and flowed through heated tubes that rotate around a common axis that is parallel to the axis of the heated tubes. The boron and nitrogen can react in the presence of a catalyst to form BNNTs. As the BNNTs exit the rotating tubes, multiple nanotubes from each of the different tubes are joined together to first form bundles due to Van der Waals attraction, which in turn form a network, all within the gas phase. The mass of tubes is then twisted into yarns as a result of the rotation of the reaction tubes and carried down the furnace with the gas flow where the yarn can eventually be wound up on a bobbin. Twist (pitch) angles of the yarn can be controlled, for example, by varying the speed of rotation of the tubes, the rate of nanotube production (gas flow), or both. The resulting yarn can be collected on a spool or bobbin that receives the yarn soon after the yarn exits the furnace. This continuous process can provide indefinitely long lengths of BNNT yarn and includes individual BNNTs having lengths of greater than 10 microns to over one millimeter, one centimeter or even several meters long.

CNT fibers and BNNT fibers can be woven together by various suitable methods and apparatus such as those methods and apparatus used for traditional weaving and knitting of wool or other threads.

Fibers and metal wires can be woven together to make a textile or similar structure by various suitable methods and apparatus such as those methods and apparatus used for traditional knitting and weaving. Here, one thread cone is replaced by a cone that has metal wire.

Metal particles can be introduced to CNT fibers, BNNT fibers, or both by various suitable methods and apparatus. For example, metal particles can be introduced during thread spinning by deposition. Additionally, or alternatively, metal particles can be introduced during the removal of the tubes from the reactor or from the "forest" by immersing the tubes into a bath with colloidal metal particles during spinning. As a result of introducing the metal particles to the fibers, the metal particles become disposed on, deposited on, embedded in, dispersed on or in, or otherwise on or in, a surface, a pore, or other facet/structure of the fibers or threads made of CNT, BNNT, or both CNT and BNNT.

Aspects described also generally relate to uses of the current collectors in batteries and such batteries can be utilized with, or otherwise incorporated into, various devices utilizing batteries such as automobiles, other land vehicles (trucks), trains, aircraft, watercraft, satellite systems. An exemplary, but non-limiting, battery is described in relation to FIG. 1.

In at least one aspect, the battery 100 can be electrically coupled by known methods to any suitable article, or one or more components of the article, that is or can be operated by an battery. Illustrative, but non-limiting, examples of such articles can include a land vehicle, an aircraft, a watercraft, a spacecraft, a satellite, light emitting diode, consumer electronics (such as laptop computers, antennas, car radios, mobile phones, watches, and telecommunications base stations), a motor, a wind turbine, a bridge, a building, a pipeline, or components thereof. The battery 100 can be incorporated into various other devices such as storage batteries for power generating units using wind power or sunlight, electric vehicles, uninterruptable power supplies (UPS), and household storage batteries. The battery can also be used as a unit battery of a medium-large size battery pack or battery module that includes a plurality of battery cells for use as a power source of a medium-large size device. The aforementioned uses are non-limiting and other uses are contemplated.

The battery 100 can be a secondary battery or a rechargeable battery. In some aspects, the battery, after charge-discharge cycling, can show little to no dendritic growth. In at least one aspect, the cathode and anode are substantially free of dendrites such that, for example, the battery has a flat thin film even after multiple cycles (for example, up to about 200 cycles), and/or that the metal surface roughness does not change after multiple cycles (for example, up to about 200 cycles).

Overall, current collectors of the present disclosure, and uses thereof in batteries, can effectively suppress growth or eliminate growth of lithium dendrites. The batteries having current collectors described herein can have improved Coulombic efficiency, cycle life, and improved safety relative to conventional lithium metal batteries.

Aspects Listing

The present disclosure provides, among others, the following aspects, each of which can be considered as optionally including any alternate aspects:

Clause 1. A current collector, comprising:
a first component comprising a carbon nanotube; and
a second component comprising a boron-nitride nanotube, wherein the first component is coupled to the second component.

Clause 2. The current collector of Clause 1, further comprising a third component comprising an electrically conductive material, the third component coupled to the first component, the second component, or a combination thereof.

Clause 3. The current collector of Clause 2, wherein the electrically conductive material comprises copper, aluminum, nickel, platinum, zinc, titanium, stainless steel, sintered carbon, or combinations thereof.

Clause 4. The current collector of Clause 2 or Clause 3, wherein the third component is in the form of particles.

Clause 5. The current collector of any one of Clauses 2-4, wherein the third component is in the form of a fiber.

Clause 6. The current collector of any one of Clauses 2-5, wherein:
the first component is in the form of a first fiber; and
the second component is in the form of a second fiber.

Clause 7. The current collector of Clause 6, wherein the first fiber and the second fiber are woven.

Clause 8. The current collector of any one of Clauses 1-7, wherein an amount of the boron-nitride nanotube in the current collector is about 20 wt % or more based on a total weight of the carbon nanotube and the boron-nitride nanotube in the current collector.

Clause 9. A battery comprising:
an electrode; and
a current collector disposed over at least a portion of the electrode, the current collector comprising:
a first fiber comprising a carbon nanotube, a boron-nitride nanotube, or a combination thereof; and
a second fiber comprising a carbon nanotube, a boron-nitride nanotube, or a combination thereof,
wherein an amount of boron-nitride nanotube in the current collector is about 20 wt % or more based on a total weight of the carbon nanotube and the boron-nitride nanotube in the current collector.

Clause 10. The battery of Clause 9, wherein the current collector is a woven or non-woven fabric.

Clause 11. The battery of Clause 9 or Clause 10, further comprising a first electrically conductive material.

Clause 12. The battery of Clause 11, wherein the first electrically conductive material comprises copper, aluminum, nickel, platinum, zinc, titanium, stainless steel, sintered carbon, or combinations thereof.

Clause 13. The battery of Clause 11 or Clause 12, wherein:
the second fiber is adjacent to the first fiber;
the current collector further includes a third fiber, the third fiber comprising a second electrically conductive material, the second electrically conductive material and the first electrically conductive material being the same or different; and
a first portion of the third fiber is overlaid over the first fiber and the second fiber, and a second portion of the third fiber is positioned under the first fiber and the second fiber.

Clause 14. The battery of any one of Clauses 11-13, wherein:
the second fiber is overlaid over the first fiber; and
the first electrically conductive material is in the form of particles, the particles disposed on one or more surfaces of the first fiber, the second fiber, or a combination thereof.

Clause 15. An article, comprising:
a device; and
a battery electrically coupled to the device, the battery comprising:
  a first current collector;
  a cathode disposed over at least a portion of the first current collector;
  a separator disposed over at least a portion of the cathode;
  an anode disposed over at least a portion of the separator; and
  a second current collector disposed over at least a portion of the anode,
  wherein the first current collector, the second current collector, or each of the first and second current collectors, comprises:
    a first component comprising a carbon nanotube, a boron-nitride nanotube, or a combination thereof, wherein, when the first component includes a boron-nitride nanotube, an amount of boron-nitride nanotube in the first component is about 20 wt % or more based on a total weight of the first current collector;
    a second component comprising a boron-nitride nanotube, a carbon nanotube, or a combination thereof, wherein, when the second component includes a boron-nitride nanotube, an amount of boron-nitride nanotube in the second component is about 20 wt % or more based on a total weight of the second current collector Clause 16. The article of Clause 15, wherein the device is a component of a land vehicle, an aircraft, a watercraft, a spacecraft, a satellite, a light emitting diode, a consumer electronic, a wind turbine, a building, a bridge, or a pipeline.

Clause 17. The article of Clause 15 or Clause 16, wherein the first component and the second component are coupled to each other in the form of a single fiber.

Clause 18. The article of any one of Clauses 15-17, wherein the first component is a first fiber, the second component is a second fiber, the second fiber overlaid over at least a first portion of the first fiber, the second fiber disposed under at least a second portion of the first fiber.

Clause 19. The article of any one of Clauses 15-18, wherein:
  the first current collector, the second current collector, or a combination thereof further comprises particles; and
  the particles are disposed on one or more surfaces of the first fiber, the second fiber, or a combination thereof, the particles comprising an electrically conductive material.

Clause 20. The article of any one of Clauses 15-19, wherein:
  the first current collector, the second current collector, or a combination thereof, further comprises a third fiber, the third fiber comprising an electrically conductive material;
  the second fiber is adjacent to the first fiber; and
  a first portion of the third fiber is overlaid over the first fiber and the second fiber, and a second portion of the third fiber is positioned under the first fiber and the second fiber.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a nanotube" include aspects comprising one, two, or more nanotubes, unless specified to the contrary or the context clearly indicates only one nanotube is included. As another example, aspects comprising "a fiber" include aspects comprising one, two, or more fibers, unless specified to the contrary or the context clearly indicates only one fiber is included.

While the foregoing is directed to aspects of the present disclosure, other and further aspects of the disclosure may be devised without departing from the basic scope thereof, and the scope thereof is determined by the claims that follow.

What is claimed is:

1. A current collector, comprising:
   a first component comprising a carbon nanotube;
   a second component comprising a boron-nitride nanotube, wherein the first component is coupled to the second component; and
   a third component comprising an electrically conductive material, the third component coupled to the first component, the second component, or a combination thereof, wherein:
     the first component is in the form of a first fiber; and
     the second component is in the form of a second fiber.

2. The current collector of claim 1, wherein the electrically conductive material comprises copper, aluminum, nickel, platinum, zinc, titanium, stainless steel, sintered carbon, or combinations thereof.

3. The current collector of claim 1, wherein the third component is in the form of particles.

4. The current collector of claim 1, wherein the third component is in the form of a fiber.

5. The current collector of claim 1, wherein the first fiber and the second fiber are woven.

6. The current collector of claim 1, wherein an amount of the boron-nitride nanotube in the current collector is about 20 wt % or more based on a total weight of the carbon nanotube and the boron-nitride nanotube in the current collector.

7. A battery comprising:
an electrode; and
a current collector disposed over at least a portion of the electrode, the current collector comprising:
a first fiber comprising a carbon nanotube, a boron-nitride nanotube, or a combination thereof; and
a second fiber comprising a carbon nanotube, a boron-nitride nanotube, or a combination thereof,
wherein an amount of boron-nitride nanotube in the current collector is about 20 wt % or more based on a total weight of the carbon nanotube and the boron-nitride nanotube in the current collector.

8. The battery of claim 7, wherein the current collector is a woven or non-woven fabric.

9. The battery of claim 7, further comprising a first electrically conductive material.

10. The battery of claim 9, wherein the first electrically conductive material comprises copper, aluminum, nickel, platinum, zinc, titanium, stainless steel, sintered carbon, or combinations thereof.

11. The battery of claim 9, wherein:
the second fiber is adjacent to the first fiber;
the current collector further includes a third fiber, the third fiber comprising a second electrically conductive material, the second electrically conductive material and the first electrically conductive material being the same or different; and
a first portion of the third fiber is overlaid over the first fiber and the second fiber, and a second portion of the third fiber is positioned under the first fiber and the second fiber.

12. The battery of claim 9, wherein:
the second fiber is overlaid over the first fiber; and
the first electrically conductive material is in the form of particles, the particles disposed on one or more surfaces of the first fiber, the second fiber, or a combination thereof.

13. An article, comprising:
a device; and
a battery electrically coupled to the device, the battery comprising:
a first current collector;
a cathode disposed over at least a portion of the first current collector;
a separator disposed over at least a portion of the cathode;
an anode disposed over at least a portion of the separator; and
a second current collector disposed over at least a portion of the anode,
wherein the first current collector, the second current collector, or each of the first and second current collectors, comprises:
a first component comprising a carbon nanotube, a boron-nitride nanotube, or a combination thereof, wherein, when the first component includes a boron-nitride nanotube, an amount of boron-nitride nanotube in the first component is about 20 wt % or more based on a total weight of the first current collector; and
a second component comprising a boron-nitride nanotube, a carbon nanotube, or a combination thereof, wherein, when the second component includes a boron-nitride nanotube, an amount of boron-nitride nanotube in the second component is about 20 wt % or more based on a total weight of the second current collector,
wherein the first component and the second component are coupled to each other in the form of a single fiber, or
wherein the first component is a first fiber, the second component is a second fiber, the second fiber overlaid over at least a first portion of the first fiber, the second fiber disposed under at least a second portion of the first fiber.

14. The article of claim 13, wherein the device is a component of a land vehicle, an aircraft, a watercraft, a spacecraft, a satellite, a light emitting diode, a consumer electronic, a wind turbine, a building, a bridge, or a pipeline.

15. The article of claim 13, wherein:
the first current collector, the second current collector, or a combination thereof further comprises particles; and
the particles are disposed on one or more surfaces of the first fiber, the second fiber, or a combination thereof, the particles comprising an electrically conductive material.

16. The article of claim 13, wherein:
the first current collector, the second current collector, or a combination thereof, further comprises a third fiber, the third fiber comprising an electrically conductive material;
the second fiber is adjacent to the first fiber; and
a first portion of the third fiber is overlaid over the first fiber and the second fiber, and a second portion of the third fiber is positioned under the first fiber and the second fiber.

* * * * *